(No Model.)

E. W. COOKE.
CAR AXLE BOX.

No. 442,351. Patented Dec. 9, 1890.

Witnesses:

Inventor:
Ernest W. Cooke
by Stauffer Brothers.
Attorney.

UNITED STATES PATENT OFFICE.

ERNEST WM. COOKE, OF CHICAGO, ILLINOIS, ASSIGNOR TO THE AMERICAN ROLLER BEARING COMPANY, OF SAME PLACE.

CAR-AXLE BOX.

SPECIFICATION forming part of Letters Patent No. 442,351, dated December 9, 1890.

Application filed December 2, 1889. Serial No. 332,359. (No model.)

*To all whom it may concern:*

Be it known that I, ERNEST WILLIAM COOKE, a citizen of the United States, residing at Chicago, in the county of Cook and State of Illinois, have invented a new and useful Improvement in Car-Wheels, a device for taking up end-thrust, of which the following is a specification.

My invention relates to that class of car-wheels in which the wheel runs on a fixed axle by means of roller-bearings, and in which the end of the axle is provided with a ball-bearing in lieu of a pin or journal, my object being to provide a means for taking up the end-thrust on an axle for cars and to prevent the running of the axle and rollers out of line or adjustment. This object I attain by means of the device shown in the accompanying drawings, in which—

Figure 1:
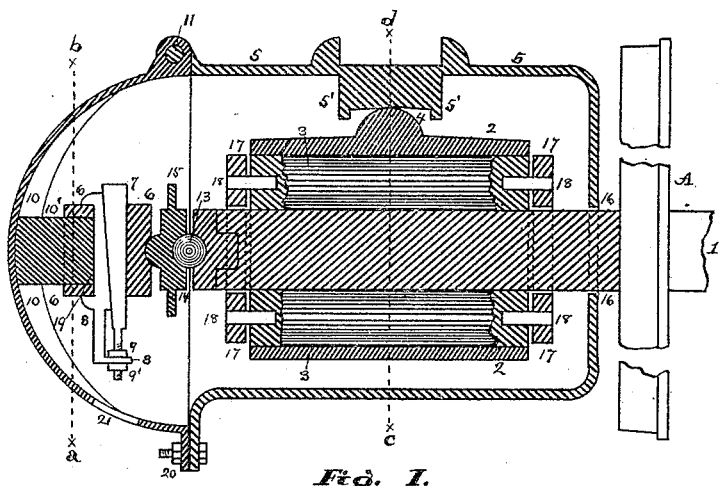
Figure 3:
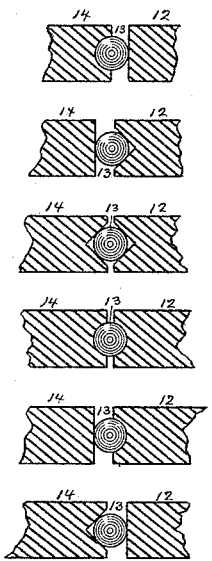
Figure 2:
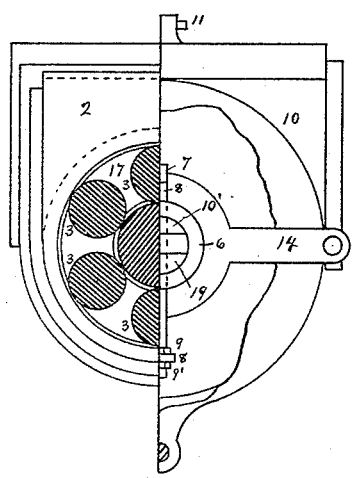
Figure 4:
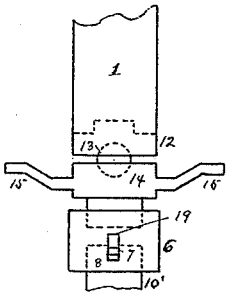

Figure 1 is a vertical sectional view of the car-wheel and axle with the end take-up. Fig. 2 is a vertical sectional view through the lines *a b* and *c d*. Fig. 3 is a series of end plates and axles with the ball interposed. Fig. 4 is a top view of the axle and take-up with the ball-bearing.

Similar letters refer to similar parts throughout the several views.

I make an axle 1, which is secured to the wheel A, the said wheel A being placed at a convenient distance from the end of the axle. Between the wheel on the axle and the end of the axle I turn a journal 16. At the outer end of the journal 16 I set in a face-plate 12, made of hardened metal, and in the outer face of this face-plate 12 I make a depression or pit of a round—that is, spherical, conical, or other convenient shape to carry the hardened metal ball 13. If, however, it is found more convenient to make this face-plate 12 flat and make the pit to carry the ball 13 in the opposite or fulcrum plate, I do not wish to be confined to the prescribed form of plate.

In juxtaposition with the face-plate 12 and ball 13 I make a fulcrum-plate 14. The said fulcrum-plate 14 is constructed with a cylindrical bearing-surface on the outer surface, having the cylinder on the outside of the body and placed horizontally on the outer face. The body of the fulcrum-plate is round or disk-shaped, and on two sides has bent arms 15, extending horizontally and provided with bolts and nuts to secure it to the sides of the box. On the cylindrical ridge of the fulcrum-plate I fit a collar 6, which has a longitudinal mortise 19 in the center to accommodate a series of adjustable wedges 7 and 8. The collar 6 is mortised on the end adjacent to the fulcrum-plate with a depression to accommodate the ridge of the said plate, and on the outer end of this said collar 6 is a depression to accommodate the pin 10' of the external cap 10, which pin 10' enters the depression in the collar 6 and allows of play of the collar forward and backward on the pin 10'. On the outside of the collar 6 is the cap 10, to which the pin 10' is attached, the said cap 10 being secured to the box 5 by the hinge 11 and made to swing upward and outward, and is fastened at the bottom by the nut 20.

The axle 1 within the box 5 revolves within the cage 17, which cage 17 carries a series of rollers 3, the ends of which are supported by pins 18. The said rollers 3 revolve within the sleeve 2. This sleeve 2 has on the upper side, which is made thicker in the middle to add strength, a cylindrical fulcrum 4, placed at or near the center of the said sleeve and resting in a chair 5', made fast to the box 5, which said box 5 has lugs to secure it to the car-timbers. In the cap 10, at a convenient point, I make a hole 21, by which a wrench may be introduced and the nut 9' turned to set up the wedges 7 and 8.

Having thus described the parts of my invention, I now proceed to explain the method of using the same. I put the parts together in their proper form, letting the weight of the car rest upon the fulcrum 4, which transmits the weight to the cage 17 and roller 3. This arrangement allows of a ready and automatic adjustment of the rollers to the changes in angle or position of the axle 1. The fulcrum-plate 14 also acts automatically to accommodate the change of position of the axle to the box 5. The wedges 7 and 8, by means of the nuts 9 and 9', permit of the taking up of all slack or loose motion between the end of the axle 1 and the fulcrum-plate 14, and the collar 6 and the cap 10, as described.

I am aware that axle-boxes have been made with a cage and a series of rollers revolving within a sleeve, and I do not therefore lay claim to the broad principle of roller-bearings as applied to devices for taking up end-thrust; but What I do claim, and desire to obtain Letters Patent of the United States for, is—

1. In a device for taking up end-thrust of car-wheels, the combination of an axle and fixed wheel revolving in a sleeve containing a cage and rollers, pivoted by a fulcrum to the axle-box, combined with a ball playing in a pit in the end of the said axle, which said ball plays in a similar pit in the fulcrum-plate attached by a collar and horizontal pin to the hinged cap on the end of the axle-box, all as and for the purpose set forth and described.

2. In a device for taking up end-thrust of car-wheels, the combination of an axle, fixed wheel, rollers, cage, sleeve, fulcrum, fulcrum-seat, and axle-box, with a ball-bearing on the end of the said axle playing in a pit in the end of such axle, combined with a fulcrum-plate pivoted by the fulcrum on the center of the plate to a sliding collar having a fore-and-aft motion, moving on the central pin of the hinged cap of the axle-box and prevented from rotating by the wedges set in the mortise of the said collar and a similar one in the said pin, all as and for the purpose set forth and described.

3. In a device for taking up end-thrust in car-wheels, the combination of a hinged cap to the axle-box, having a central pin mortised, with a rectangular longitudinal slot, combined with a collar fitting over the pin, having a similar mortise to the one in the pin, and which said collar carries a series of wedges designed to take up the slack by adjusting the nuts at the end of the same, with the fulcrum-plate and end ball and axle with a fixed wheel, all as and for the purpose set forth and described.

4. In a device for taking up end-thrust in car-wheels, the combination of the axle and fixed wheel, with a ball rolling in a conical or spherical pit in the end of said axle, combined with a fulcrum-plate having a corresponding pit or flat surface, against which the ball of the axle runs with the collar, pin, and take-up wedges, all as and for the purpose set forth and described.

5. In a device for taking up end-thrust in car-wheels, the combination of the axle-wheel, cage, rollers, fulcrum-seat, and axle-box, combined with the fulcrum-plate, collar, wedges, pin, and the hinged cap provided with a hole in the lower face of the said hinged cap to allow of the tightening of the nuts on the said wedges, all as and for the purpose as set forth and described.

In testimony whereof I have hereunto set my hand this 9th day of November, A. D. 1889.

ERNEST WM. COOKE.

In presence of—
  I. McAllister,
  T. E. Sheeke.